United States Patent
Ramamurthy et al.

(10) Patent No.: US 8,108,154 B2
(45) Date of Patent: Jan. 31, 2012

(54) $NO_x$ EMISSION ESTIMATION SYSTEMS AND METHODS

(75) Inventors: Ravishankar Ramamurthy, Westland, MI (US); Shouxian Ren, Ann Arbor, MI (US)

(73) Assignee: GM Global Technology Operations LLC

( * ) Notice: Subject to any disclaimer, the term of this patent is extended or adjusted under 35 U.S.C. 154(b) by 494 days.

(21) Appl. No.: 12/331,884

(22) Filed: Dec. 10, 2008

(65) Prior Publication Data
US 2010/0145628 A1   Jun. 10, 2010

(51) Int. Cl.
*G06N 31/00* (2006.01)
*F01N 3/00* (2006.01)

(52) U.S. Cl. ............ 702/23; 60/285; 60/256; 123/25 C; 701/108

(58) Field of Classification Search ............... 702/22, 702/23, 24, 30–32, 113; 60/276, 285, 286; 123/25 C, 683; 701/108, 114
See application file for complete search history.

(56) References Cited

U.S. PATENT DOCUMENTS

| | | | |
|---|---|---|---|
| 6,195,987 B1 | 3/2001 | Miyashita | |
| 6,378,515 B1 | 4/2002 | Geyer | |
| 7,155,331 B1 * | 12/2006 | Zhang et al. | 701/108 |
| 7,513,222 B2 * | 4/2009 | Orlosky | 123/25 C |
| 2010/0024397 A1 * | 2/2010 | Chi et al. | 60/285 |
| 2010/0115926 A1 * | 5/2010 | Nagaoka et al. | 60/286 |
| 2010/0139250 A1 * | 6/2010 | Andersson et al. | 60/285 |

* cited by examiner

*Primary Examiner* — John H Le

(57) ABSTRACT

A $NO_x$ estimation system includes an operating mode determination module that determines an operating mode of an engine, and an emission prediction module. The emission prediction module estimates $NO_x$ emission based on the operating mode, a plurality of sensed parameters, and a map. The map correlates the plurality of sensed parameters to the $NO_x$ emission based on the operating mode.

20 Claims, 3 Drawing Sheets

NO$_x$ EMISSION ESTIMATION SYSTEMS AND METHODS

FIELD

The present disclosure relates generally to exhaust systems and more particularly to NO$_x$ estimation systems and methods for estimating NO$_x$ emissions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Diesel engine operation involves combustion that generates exhaust gas. During combustion, an air/fuel mixture is delivered through an intake manifold to cylinders and is combusted therein. After combustion, the pistons inside the cylinders force exhaust gas in the cylinders into an exhaust system.

The exhaust system may include a selective catalyst reduction (SCR) unit that reduces NO$_x$ emission before the exhaust gas is released to the atmosphere. A dosing system injects a reductant (such as, for example only, urea) into the exhaust gas upstream from the SCR unit.

To effectively reduce NO$_x$ emissions in the SCR unit, monitoring the concentration of NO$_x$ in the exhaust gas upstream from the SCR unit ensures effective reduction of NO$_x$ emissions. For example, an exemplary exhaust system generally includes a first NO$_x$ sensor upstream from the SCR unit and a second NO$_x$ sensor arranged downstream from the SCR unit. The first NO$_x$ sensor measures the amount of NO$_x$ in the exhaust gas prior to treatment. The dosing system injects a predetermined amount of reductant based on the measured NO$_x$ emissions. The second NO$_x$ sensor monitors NO$_x$ emissions released to the atmosphere. NO$_x$ sensors are costly and the readings from the NO$_x$ sensors also need to be monitored for accuracy.

SUMMARY

Accordingly, a NO$_x$ estimation system in accordance with the teachings of the present disclosure includes an operating mode determination module that determines an operating mode of an engine, and an emission prediction module. The emission prediction module estimates NO$_x$ emission based on the operating mode, a plurality of sensed parameters, and a map. The map correlates the plurality of sensed parameters to the NO$_x$ emission based on the operating mode.

In other features, the map is created as a function of injected fuel quantity and engine speed. The estimated NO$_x$ emission based on the map may be corrected to compensate for variations in ambient temperature.

A method of estimating NO$_x$ emission of an engine includes determining an operating mode of the engine, and determining NO$_x$ emission based on the operating mode, a plurality of sensed parameters, and a map. The map correlates the plurality of sensed parameters to the NO$_x$ emission based on the operating mode.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
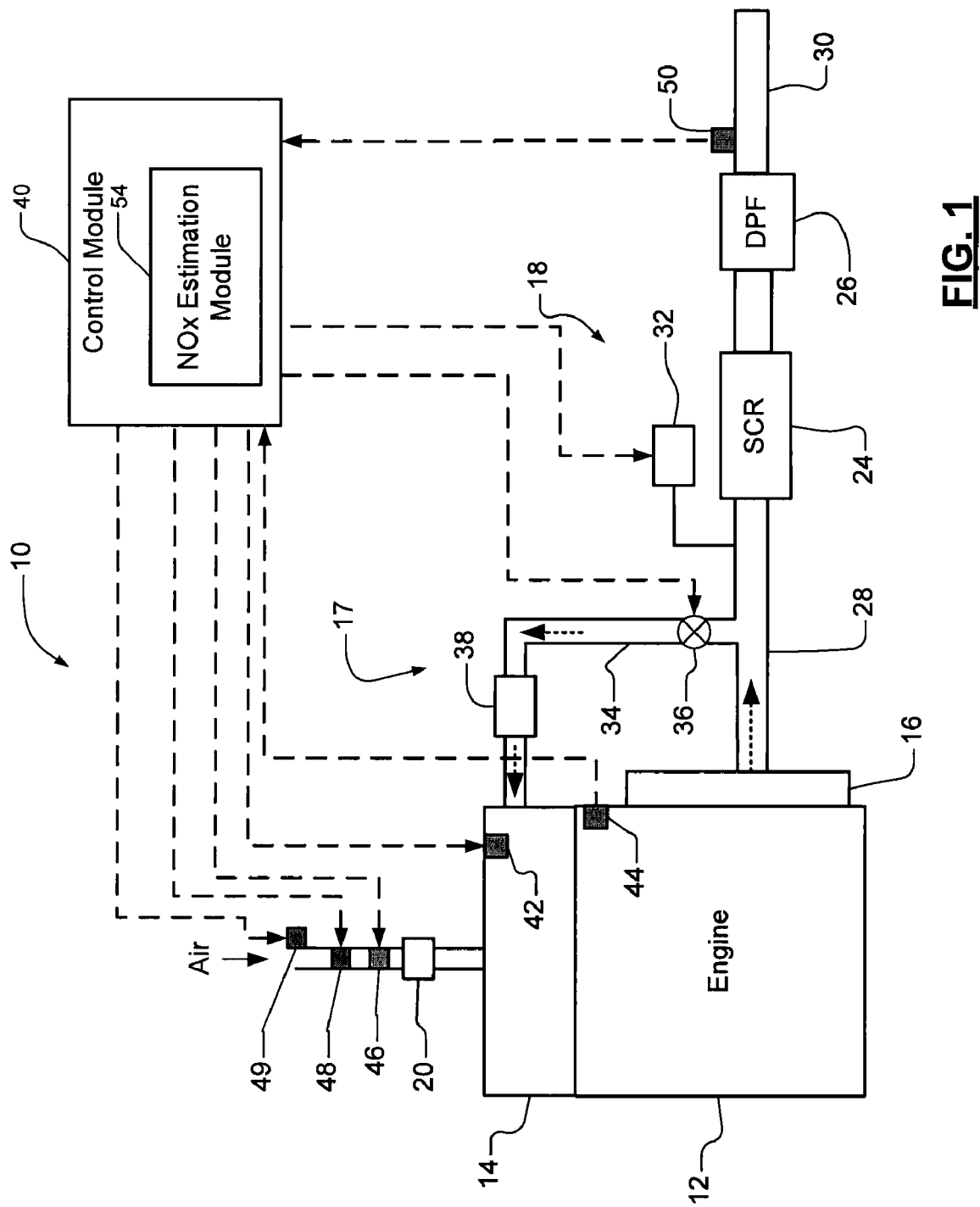
FIG. 1 is a functional block diagram of an engine system that includes a NO$_x$ estimation module in accordance with the teachings of the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

A NO$_x$ estimation module in accordance with the teachings of the present disclosure includes an operating mode determination module and an emission prediction module. The emission prediction module includes a plurality of maps that correspond to a plurality of operating modes of the engine. The emission prediction module estimates NO$_x$ emission based on a plurality of sensed parameters and one of the maps that corresponds to an operating mode determined by the operating mode determination module.

Referring now to FIG. 1, a diesel engine system 10 includes a diesel engine 12, an intake manifold 14, an exhaust manifold 16, an exhaust gas recirculation (EGR) system 17, and an exhaust system 18. While a diesel engine system is illustrated, it is appreciated that the NO$_x$ estimation module, which will be described later, can be applied to gasoline engines.

Air is drawn through a throttle 20 into the intake manifold 14 and is distributed to cylinders (not shown). Fuel is injected into the cylinders by a common rail injection system (not shown). The air is compressed in the cylinders and heat of the compressed air ignites the air/fuel mixture. The combustion of the air/fuel mixture generates combustion force to drive pistons (not shown) that rotatably drive a crankshaft (not shown). The exhaust gas exits from the cylinders through the exhaust manifold 16 and into the exhaust system 18.

The exhaust system 18 includes a selective catalytic reduction (SCR) unit 24 and a diesel particulate filter (DPF) 26. The SCR unit 24 communicates with the exhaust manifold 16 through an exhaust pipe 28. A tail pipe 30 is provided downstream from the DPF 26.

The SCR unit 24 removes NO$_x$ from the exhaust gas through an SCR process. A dosing system 32 injects a reductant (such as, for example only, urea) into the exhaust gas upstream from the SCR unit 24. The amount of the reductant to be injected for an effective SCR process depends on concentration of NO$_x$ emissions in the exhaust gas that leaves the exhaust manifold 16 (i.e., "engine-out NOx emission").

The DPF 26 is provided downstream from the SCR unit 24 for removing diesel particulate matter and/or soot from the exhaust gas. The DPF 26 filters particulates from the exhaust gas before the exhaust gas is released to the atmosphere. While the DPF 26 is shown in FIG. 1 as provided downstream from the SCR unit 24, the arrangement of the SCR unit 24 and the DPF 26 can be reversed.

The EGR system 17 includes an EGR conduit 34 that communicates with the exhaust pipe 28, an EGR valve 36, and an EGR cooler 38. The EGR valve 36 controls the amount of exhaust gas that needs to be re-circulated circulated to the intake manifold 14. The EGR cooler 38 cools the re-circulated exhaust gas.

When the exhaust gas leaves the exhaust manifold 16, a portion of the exhaust gas is directed to the EGR conduit 34 through the EGR valve 36 to the intake manifold 14. The remaining portion of the exhaust gas is directed to the SCR unit 24 and the DPF 26 for treatment before being released to the atmosphere. The re-circulated exhaust gas is mixed at the intake manifold 14 with air from an intake throttle 20. The amount of the intake air is controlled by the intake throttle 20. The amount of re-circulated exhaust gas is controlled by the EGR valve 28. The mixture of the intake air and the re-circulated exhaust gas is sent to the engine 12.

A control module 40 communicates with a plurality of sensors for monitoring the engine operation and controls the engine operation accordingly. The plurality of sensors include, but are not limited to, an intake manifold absolute pressure (MAP) sensor 42, an engine speed sensor 44, a mass air flow (MAF) sensor 46, an intake air temperature (IAT) sensor 48, a barometric pressure sensor 49, and a $NO_x$ sensor 50 provided at the tailpipe 30. The MAP sensor 42 measures an intake manifold pressure (boost) to the engine 12. The engine speed sensor 44 measures engine speed (RPM). The MAF sensor 46 measures the MAF into the intake manifold 14. The IAT sensor 48 measures an IAT. The barometric pressure sensor 49 measures the barometric pressure. The $NO_x$ sensor 50 measures $NO_x$ emissions in the exhaust gas after the exhaust gas is treated by the SCR unit 24 and the DPF 26.

The control module 40 includes a $NO_x$ estimation module 54 that provides an estimated engine-out $NO_x$ emission based on a plurality of engine parameters that are sensed by the plurality of sensors 42, 44, 46, 48 and 49.

Figure 2:
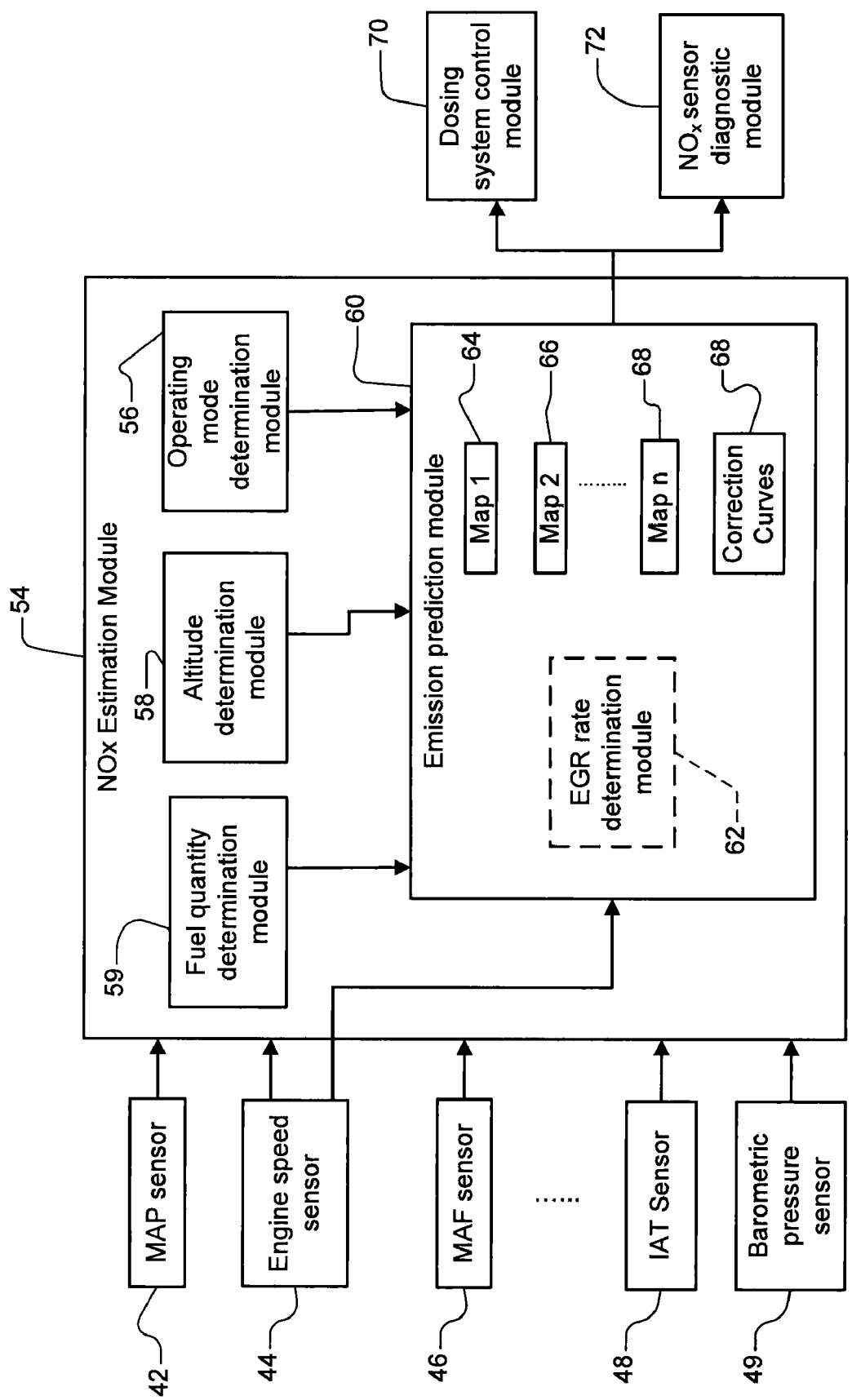
FIG. 2 is a functional block diagram of a NO$_x$ estimation module in accordance with the teachings of the present disclosure.

Referring to FIG. 2, the $NO_x$ estimation module 54 includes an operating mode determination module 56, an altitude determination module 58, a fuel quantity determination module 59, and an emission prediction module 60. The engine 12 may be operated in one of a plurality of operating modes, including, but not limited to, a steady-state mode, a transient mode, and an EGR-off mode. The operating mode determination module 56 may determine an operating mode of the engine based on, for example only, engine speeds, EGR rate, fuel injection timing, and/or the quantity of injected fuel. The altitude determination module 58 determines the altitude of the vehicle based on ambient conditions (such as, for example only, barometric pressure). The fuel quantity determination module 59 determines a desired fuel quantity based on a desired engine torque.

The emission prediction module 60 communicates with the operating mode determination module 56 and the altitude determination module 58 and receives signals therefrom indicating the operating mode of the engine and the altitude of the vehicle, respectively. The emission prediction module 60 also receives data from the fuel quantity estimation module 59, and the engine speed sensor 44.

The emission prediction module 60 includes a plurality of maps 64, 66 and 68 that include correlations among $NO_x$ emission, and a plurality of engine parameters that have an effect on the $NO_x$ emission. The plurality of engine parameters include, but are not limited to, EGR rate (Kg/min), boost (Kpa), injection timing (degrees before Top Dead Center), engine speed (RPM), injected fuel quantity ($mm^3$/stroke), barometric pressure (KPa), intake air temperature (° C.). The correlations among the engine-out $NO_x$ emission and the plurality of engine parameters may be determined based on engine-dynamometer tests.

The plurality of maps 64, 66 and 68 correspond to the plurality of operating modes of the engine and may be further based on altitudes of the vehicle. The altitudes of the vehicle that correspond to the maps may include, but are not limited to, sea level, 5500 ft, and 12000 ft. The plurality of maps 64, 66, 68 are created as function of engine speed and injected fuel quantity.

The emission prediction module 60 identifies an appropriate map that corresponds to the operating mode of the engine and the altitude and determines the $NO_x$ emission level based on the map and the fuel quantity and engine speed. As such, the engine-out $NO_x$ emission for a particular operating mode and/or altitude at a particular engine speed may be estimated.

More specifically, the emission prediction module 60 identifies an appropriate map that corresponds to the engine operating mode and altitude. The emission prediction module 60 then maps the injected fuel quantity and the engine speed to the $NO_x$ emission on the appropriate map. While engine parameters other than injected fuel quantity and engine speed also affect engine-out $NO_x$ emission, these engine parameters are functions of the EGR rate that can be determined based on the injected fuel quantity and the engine speed. Therefore, the emission prediction module 60 correlates the plurality of sensed engine parameters to the map by using fuel quantity and engine speed only without complex calibrations.

Alternatively, the plurality of maps 64, 66, 68 may be created as function of EGR rate. In this situation, the emission prediction module 60 may include an EGR determination module 62 that determines an EGR rate based on the desired fuel quantity and the engine speed. When the engine is under an EGR-on mode, the emission prediction module 60 may identify a map with correlations between the EGR rate and the $NO_x$ emission and estimate the $NO_x$ emission based on the EGR rate and the map. When the engine is under the EGR-off mode, the emission prediction module 60 may identify a map with correlations among the injected fuel quantity, the engine speed, and the $NO_x$ emission and estimate the $NO_x$ emission based on the injected fuel quantity, the engine speed, and the map.

The emission prediction module 60 also includes correction curves 69 for correcting variations in ambient temperature. Because the sensed engine parameters are dependent on ambient temperature, the estimated $NO_x$ emission may be corrected by correction curves 69 to compensate for variations in the ambient temperature. The intake air temperature measured by the IAT sensor 48 provides an indication of the ambient temperature.

The emission prediction module 60 may output the estimated engine-out $NO_x$ emission to a dosing system control module 70 that controls the dosing system 32 based on the estimated engine-out $NO_x$ emission. Alternatively, when a $NO_x$ sensor is installed to measure the engine-out $NO_x$ emission, the emission prediction module 60 may output the estimated $NO_x$ emission to a $NO_x$ sensor diagnostic module 72 for diagnosis.

The $NO_x$ estimation module 54 may be turned off during a regeneration mode. The $NO_x$ emission level may be estimated by using the $NO_x$ sensor 50 at the tail pipe 30 during engine regeneration.

Figure 3:
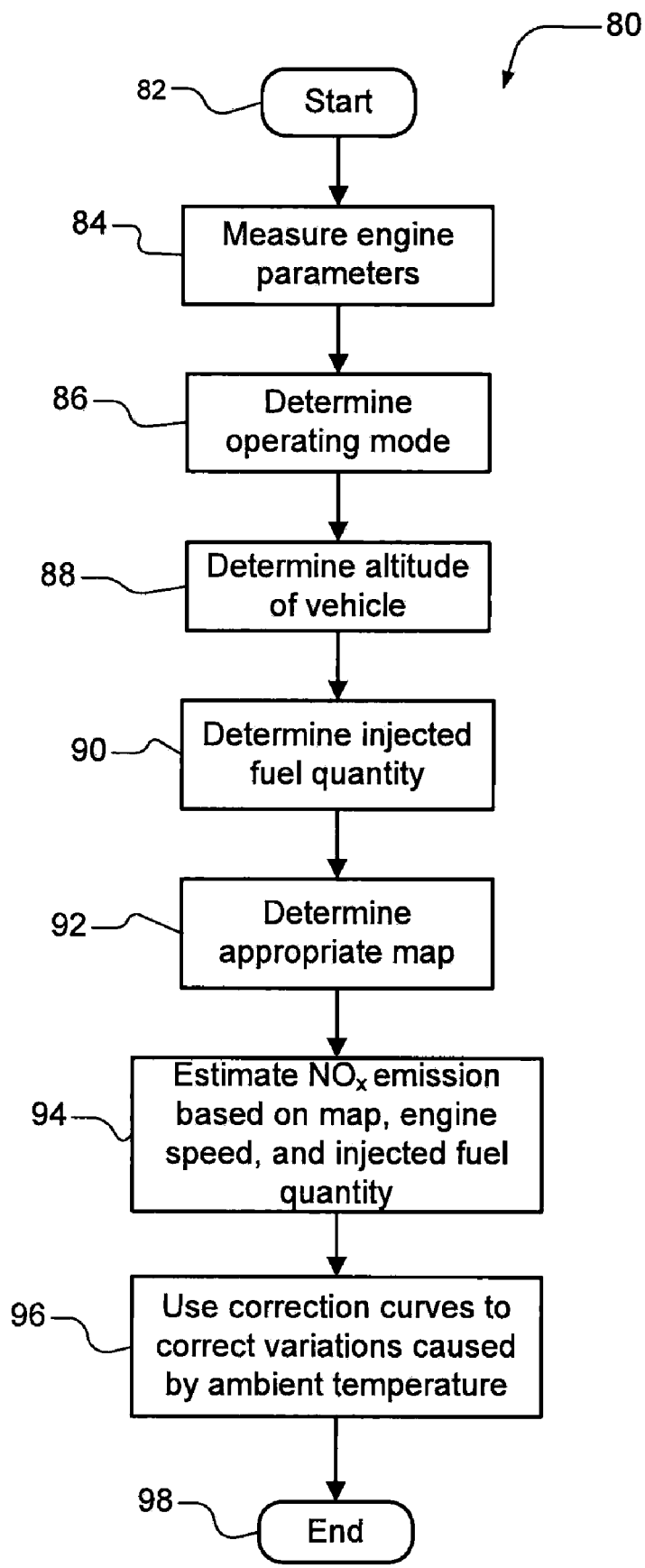
FIG. 3 is a flow diagram of a method of estimating NO$_x$ emission in accordance with the teachings of the present disclosure.

Referring to FIG. 3, a method 80 of estimating engine-out $NO_x$ emission starts in step 82. A plurality of sensors measure and sense a plurality of engine parameters and send the sensed parameters to the $NO_x$ emission module in step 84. The operating mode determination module 56 determines an operating mode in step 86. The altitude determination module 58 determines an altitude of a vehicle in step 88. The fuel quantity determination module 59 determines a desired fuel quantity based on a desired engine torque in step 90. The emission prediction module 60 identifies a map that corresponds to the operating mode of the engine and the altitude of the vehicle in step 92. The emission prediction module 60 estimates $NO_x$ emission based on the engine speed, the fuel quantity, and the map in step 94. The emission prediction module 60 then uses correction curves 69 to correct variations, if any, caused by ambient temperature in step 96. The method ends in step 98.

The $NO_x$ estimation module 54 in accordance with the present disclosure may more accurately monitor and estimate the engine-out $NO_x$ emission without using a costly $NO_x$ sensor or any new hardware and without complex calibrations. Therefore, the $NO_x$ estimation module 54 of the present disclosure may save manufacturing costs in the exhaust system 18.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A nitrogen oxide ($NO_x$) estimation system comprising:
an operating mode determination module that determines an operating mode of an engine;
an emission prediction module that estimates $NO_x$ emission of the engine based on the operating mode, an altitude of a vehicle powered by the engine, a plurality of sensed engine parameters, and a map that correlates the plurality of sensed engine parameters to the $NO_x$ emission based on the operating mode and the altitude; and
a control module that controls an operating parameter of the engine based on the estimated $NO_x$ emission.

2. The $NO_x$ estimation system of claim 1 wherein the map is function of desired injected fuel quantity and engine speed.

3. The $NO_x$ estimation system of claim 1 wherein the map is function of an EGR rate.

4. The $NO_x$ estimation system of claim 1 wherein the plurality of sensed engine parameters includes an EGR rate, an intake manifold pressure, a fuel injection timing, an engine speed, an injected fuel quantity, mass absolute pressure, and an intake air temperature.

5. The $NO_x$ estimation system of claim 1 wherein the operating mode is one of a steady-state mode, a transient mode and an EGR-off mode.

6. The $NO_x$ estimation system of claim 1 wherein correlations between the plurality of sensed engine parameters and the $NO_x$ emission are determined based on engine-dynamometer tests.

7. The $NO_x$ estimation system of claim 1 further comprising an altitude determination module that determines the altitude of the vehicle based on barometric pressure.

8. The $NO_x$ estimation system of claim 1, wherein the map is one of N maps, wherein N is an integer greater than one, wherein the N maps correspond to N predetermined altitudes, respectively, and wherein the map is selected from the N maps based on a nearest one of the N predetermined altitudes to the vehicle altitude.

9. The $NO_x$ estimation system of claim 1, wherein the emission prediction module adjusts the estimated NOx emission based on one of M correction curves, wherein M is an integer greater than one, wherein the M correction curves correspond to M predetermined ambient air temperatures, respectively, and wherein the correction curve is selected based on a nearest one of the M predetermined ambient air temperatures to a measured ambient air temperature.

10. The NOx estimation system of claim 1, wherein the operating parameter includes one of (i) an amount of dosing agent injected by a selective catalytic reduction (SCR) system and (ii) at least one of air, fuel, and spark supplied to the engine.

11. A method of estimating nitrogen oxide ($NO_x$) emission of an engine comprising:
determining an operating mode of the engine;
receiving a plurality of sensed engine parameters;
determining $NO_x$ emission based on the operating mode, an altitude of a vehicle powered by the engine, the plurality of sensed engine parameters, and a map that correlates the plurality of sensed engine parameters to the $NO_x$ emission based on the operating mode and the altitude; and
controlling an operating parameter of the engine based on the determined $NO_x$ emission.

12. The method of claim 11 wherein the map is function of injected fuel quantity and engine speed.

13. The method of claim 11 wherein the map is function of EGR rate.

14. The method of claim 11 wherein the plurality of sensed engine parameters include an EGR rate, an intake manifold pressure, a fuel injection timing, an engine speed, an injected fuel quantity, mass absolute pressure, and an intake air temperature.

15. The method of claim 11 wherein the operating mode is one of a steady-state mode, a transient mode, and an EGR-off mode.

16. The method of claim 11 further comprising determining correlations between the plurality of sensed engine parameters and the $NO_x$ emission based on engine-dynamometer tests.

17. The method of claim 11 further comprising determining the altitude of the vehicle based on barometric pressure.

18. The method of claim 11, wherein the map is one of N maps, wherein N is an integer greater than one, wherein the N maps correspond to N predetermined altitudes, respectively, and wherein the map is selected from the N maps based on a nearest one of the N predetermined altitudes to the vehicle altitude.

19. The method of claim 11, further comprising adjusting the determined NOx emission based on one of M correction curves, wherein M is an integer greater than one, wherein the M correction curves correspond to M predetermined ambient air temperatures, respectively, and wherein the correction curve is selected based on a nearest one of the M predetermined ambient air temperatures to a measured ambient air temperature.

20. The method of claim 11, wherein the operating parameter includes one of (i) an amount of dosing agent injected by a selective catalytic reduction (SCR) system and (ii) at least one of air, fuel, and spark supplied to the engine.

* * * * *